United States Patent
Felgenhauer (10) Patent No.: US 9,010,520 B2
(45) Date of Patent: Apr. 21, 2015

(54) MODULE FOR TRANSFERRING A COMPONENT BETWEEN TWO POSITIONS

(75) Inventor: Benedikt Felgenhauer, Herford (DE)

(73) Assignee: Heye International GmbH (DE)

(*) Notice: Subject to any disclaimer, the term of this patent is extended or adjusted under 35 U.S.C. 154(b) by 626 days.

(21) Appl. No.: 13/289,315

(22) Filed: Nov. 4, 2011

(65) Prior Publication Data
US 2012/0111424 A1  May 10, 2012

(30) Foreign Application Priority Data
Nov. 4, 2010 (DE) .......................... 10 2010 050 204

(51) Int. Cl.
*B65B 47/00* (2006.01)
*C03B 9/36* (2006.01)
*C03B 9/16* (2006.01)
*F16H 25/20* (2006.01)

(52) U.S. Cl.
CPC ............... *C03B 9/3618* (2013.01); *C03B 9/165* (2013.01); *F16H 25/20* (2013.01)

(58) Field of Classification Search
USPC ............... 198/468.01, 468.6, 468.4, 429, 430
See application file for complete search history.

(56) References Cited

U.S. PATENT DOCUMENTS

| | | | |
|---|---|---|---|
| 4,657,474 A | 4/1987 | Nebelung | |
| 5,169,280 A | * 12/1992 | Favre | 414/737 |
| 6,386,000 B1 | 5/2002 | Fenton et al. | |
| 7,017,374 B2 | 3/2006 | Bogert et al. | |
| 7,264,108 B2 * | 9/2007 | Borsarelli et al. | 198/429 |

FOREIGN PATENT DOCUMENTS

| | | |
|---|---|---|
| DE | 1922492 A1 | 9/1970 |
| DE | 10052937 A1 | 6/2001 |
| DE | 20020657 U1 | 2/2002 |
| EP | 0117628 A1 | 9/1984 |
| EP | 0283548 A1 | 9/1988 |
| GB | 1253192 | 11/1971 |
| JP | 62193705 A | 8/1987 |
| JP | 2003336713 A | 11/2003 |

OTHER PUBLICATIONS

Search Report dated Feb. 3, 2012, for related European Application No. 11008641.0—2111, which cites prior art.

* cited by examiner

*Primary Examiner* — Gene Crawford
*Assistant Examiner* — Lester Rushin
(74) *Attorney, Agent, or Firm* — Fox Rothschild LLP (57) ABSTRACT

A module for transferring a component of an I. S. glass molding machine, such as a blow head, between a first position and a second position along a transfer curve. The transfer curve includes a first partial movement consisting of a pivot movement around a horizontally extending axis and a second partial movement consisting of a vertically oriented linear movement in which the blow head is moved to its active position, resting to form a seal on the mouth area of a mold.

20 Claims, 5 Drawing Sheets

MODULE FOR TRANSFERRING A COMPONENT BETWEEN TWO POSITIONS

BACKGROUND

The invention relates to a module for transferring a component, namely a blow head, a baffle, or a funnel of an I. S. glass molding machine, between a first position and a second position along a transfer curve.

The production process of hollow glass articles on an I. S. glass molding machine (individual section), starting from the introduction of a molten glass drop into a preform up to the preparation of a final molded article, is characterized by numerous transport procedures and feed movements, on which increasingly manifold requirements are accordingly placed by the technical description and precision thereof. It is to be considered that the modules used in this context must be suitable for the harsh atmosphere of a glass factory, which is characterized by heat and abrasive dusts.

The transfer movement along a transfer curve between two positions is frequently applied as a superposition of a translational movement and a rotational movement, for example, in the case of the transfer of finished molded hollow glass articles, which are standing on a placement plate, onto a conveyor belt, forming rows thereon transversely to the conveyor direction thereof, the hollow glass articles subsequently being supplied to a lehr.

An assembly which is generally intended for describing a movement form which is composed of the superposition of a translational movement and a rotational movement is known from the document EP 0 283 548 A1. A slide is mounted on two piston-cylinder units, which extend in parallel and at a distance to one another, and is displaceable thereon. A drive element, which is mounted so it is rotatable around an axis extending perpendicularly to the axes thereof, is mounted on the slide, between the piston-cylinder units, which is engaged via teeth on both sides with the piston-cylinder units. A translational movement, a rotational movement, or also a combination of these two movements is describable as defined by the activation of the two piston-cylinder units in relation to the drive element.

Assemblies, in which a rotational movement and a translational movement are describable by means of a drive, are known for application in machine tool construction from each of documents JP 62-193705 A and DE 1 922 492 A1. The design embodiment of these assemblies is adapted in the specific case to the respective intended purpose, the actuation of an apparatus intended to clamp a workpiece here, and the actuation of a tool magazine there, respectively.

A module intended for describing such a transfer movement is known, for example, from document U.S. Pat. No. 7,264,108 B2 and consists of a carrier pivotable by means of a first drive around a vertical axis, on which a push rod is situated so it is linearly movable by means of a second drive situated on the carrier, an arrangement of push fingers, which are only intended for the direct grasping of the hollow glass articles and are pivotable by means of a third drive in relation to the push rod, being located on the free end of the push rod. All rotational and translational movements of this known module are configured in a horizontal plane. In modules of this type, the description of such a transfer curve is particularly important, which allows a high transfer speed without the risk of falling over or damage of the hollow glass articles. Overall, this module is characterized by a comparatively complex construction because of the necessity for three drives, two of which are situated so they are moved.

Solely for exemplary purposes, reference is also made to a module for transferring a blow head between an inactive and an active blow head, i.e., to a blow head placed on a mold or a mold set, therefore a moving machine part, which is used for transporting the blowing air. Such a module is known, for example, from document EP 0 117 628 A1 and consists of a module combining a vertical lift movement with a horizontal rotational movement. Both partial movements are controllable independently of one another and are hydraulically generated. The use of hydraulics in a glass molding machine is generally considered to be inexpedient. In addition, a construction having a relatively complex design also occurs here, which results from the use of two piston-cylinder units, which are controllable independently of one another and are intended to describe the two partial movements.

SUMMARY OF THE INVENTION

It is the object of the invention to conceive a module, which generates a lift and pivot movement between two positions, of the type presented at the beginning with respect to a simpler, robust construction which is more suitable in particular for the atmosphere of a glass factory. This object is achieved for such a module by the features as set forth below.

Accordingly, a transfer curve, which is composed of an angle-limited rotational movement around an axis and a subsequent linear movement oriented vertically to this axis, along which a component is transferable between a first position and a second position, is essential to the invention for the module, both partial movements being able to be initiated in succession by means of a uniform drive. In this way, a comparatively simple design and construction having a transfer curve which can be described in one plane results.

The mentioned axis extends horizontally, the linear movement being oriented vertically. A transfer curve in a vertical plane therefore results.

However, the invention is equally capable of describing a transfer curve in a horizontal plane or a general inclined plane.

The mentioned drive has a drive connection to a threaded spindle, which preferably extends vertically and whose rotational movement is also used to generate the two successive partial movements. A horizontal extension of the threaded spindle is not precluded, however.

The component to be moved by means of the module along the transfer curve is situated or held on a boom, which is mounted so it is pivotable around a horizontal axis. The pivot movement of the boom is applied, with the rotational angle limited, starting from a first position, in which the boom extends essentially vertically, in the direction to a position in which the boom extends horizontally.

The module consists of a framework, within which an upper carriage is situated so it is displaceable under cooperation of the mentioned drive along guides extending parallel to one another, a lower carriage being provided, which has an operational link via a crank drive to the upper carriage, which mounts a cross head. The linear movement of the upper carriage and therefore of the cross head is converted in this case via the crank drive into a pivot movement of its crank pin. The first partial movement of the transfer curve is described by the pivot movement of the crank pin around its horizontal axis. A stop is active between the carriages, which limits the displacement of the upper carriage in the direction toward the lower carriage.

According to additional features of the invention, the lower carriage is supported in the downward direction on a spring, while in contrast a path limit is configured in the upward direction. This can be formed by a clamp, a fixed stop, or the like. In any case, the carriage presses against the path limit under the pre-tension of the spring. This is a removable path limit, whose position along the guides is fixable.

If a position is reached in which the upper carriage comes into contact with the lower carriage with rotation of the mentioned crank pin via the stop, according to the features of another embodiment of the invention, a further rotation of the crank pin is no longer possible and, upon further rotation of the threaded spindle in the same direction, both carriages now move as a group against the pre-tension of the mentioned spring. As a result of the stoppage of the pivot movement, the last mentioned movement is the second partial movement, namely an exclusively linear movement. It is essential for this linear movement that a horizontal orientation of the boom at the end of the first partial movement, for example, is maintained unchanged.

While maintaining the horizontal orientation of the boom, for example, according to still more features of the invention, a simple adjustment of the vertical position of the lower carriage in relation to a reference level is configured with cooperation of the drive of the module. Both carriages are temporarily rigidly coupled to one another by means of a rail in this case, the new position of the lower carriage being set by means of the drive, and the coupling of the two carriages subsequently being disengaged again. The new position of the lower carriage is subsequently fixed via the path limit mentioned at the beginning.

Other features are directed to several exemplary design implementations of the component to be moved by means of the module along the transfer curve between the first position and the second position. This is accordingly the blow head, the baffle, or the funnel of an I. S. glass molding machine, so that the boom is mounted on a hollow shaft rotatable around a horizontal axis, which is connected to a pipeline leading to a fitting, so that the support structure of the components is simultaneously used as a blowing air line. The blow head or also the baffle can be implemented in a typical way in this case and can have multiple blow head or baffle nozzles, whose axes extend vertically in the second position mentioned at the beginning. This is also true for the funnel used to center the glass flow.

The pipeline intended for guiding the blowing air is divided according to other features into two sections which are telescopically displaceable relative to one another, the extent of the displaceability being configured as a function of the displaceability of the upper carriage provided in the direction of the guides.

A third carriage, which is configured to support the spring intended to describe the pre-tension, under which the position of the lower or second carriage stands in relation to a downward movement, can be provided according to additional features described below. In this way, namely by adjusting the position of this third carriage, the pre-tension can be set in the simplest way as needed.

It may be seen that a device for transferring a component, e.g., a blow head, along a transfer curve in a vertical plane is provided by the module according to the invention, which is distinguished by a robust construction having a simple design, and offers simple adjustment capabilities in particular.

Although the description of a transfer curve in a vertical plane is the preferred application of the module, its mechanical concept can similarly also be used for describing transfer curves in arbitrary inclined planes including a horizontal plane.

The application of the module is also not restricted to a movement of a blow head, a baffle, or a funnel of a glass molding machine and can fundamentally also be used in other functional relationships in general for transferring other components between a first position and a second position.

BRIEF DESCRIPTION OF THE DRAWINGS

The invention will be explained in greater detail hereafter with reference to the exemplary embodiment shown in the drawings. In the figures.

DETAILED DESCRIPTION

The module, which is conceived as a lift-pivot unit, is characterized by a framework consisting of two side walls 1, 2 extending vertically and parallel to one another, which form a closed frame in conjunction with top and bottom transverse walls 3, 4. Guides 5, 6, which are used as the carriers of a first carriage 7, a second carriage 8, and a third carriage 9, are located in each case on the sides of the side walls 1, 2 facing toward one another. Each carriage 7, 8, 9 is characterized by guide profiles 10, 11, which have a formfitting engagement with the guides 5, 6.

Figure 2:
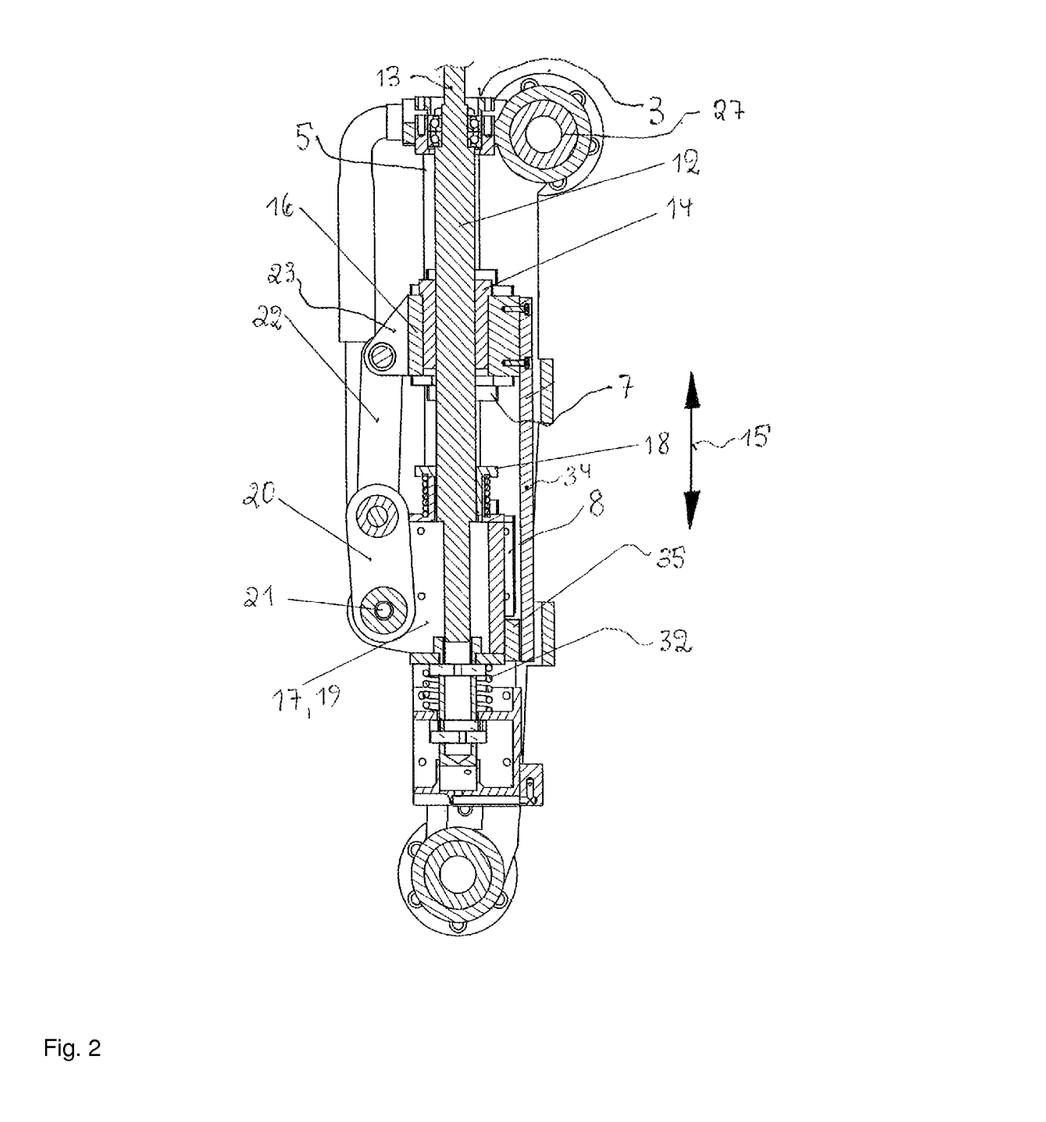
FIG. 2 shows a view of the module in a sectional plane II-II of FIG. 1.
Figure 3:
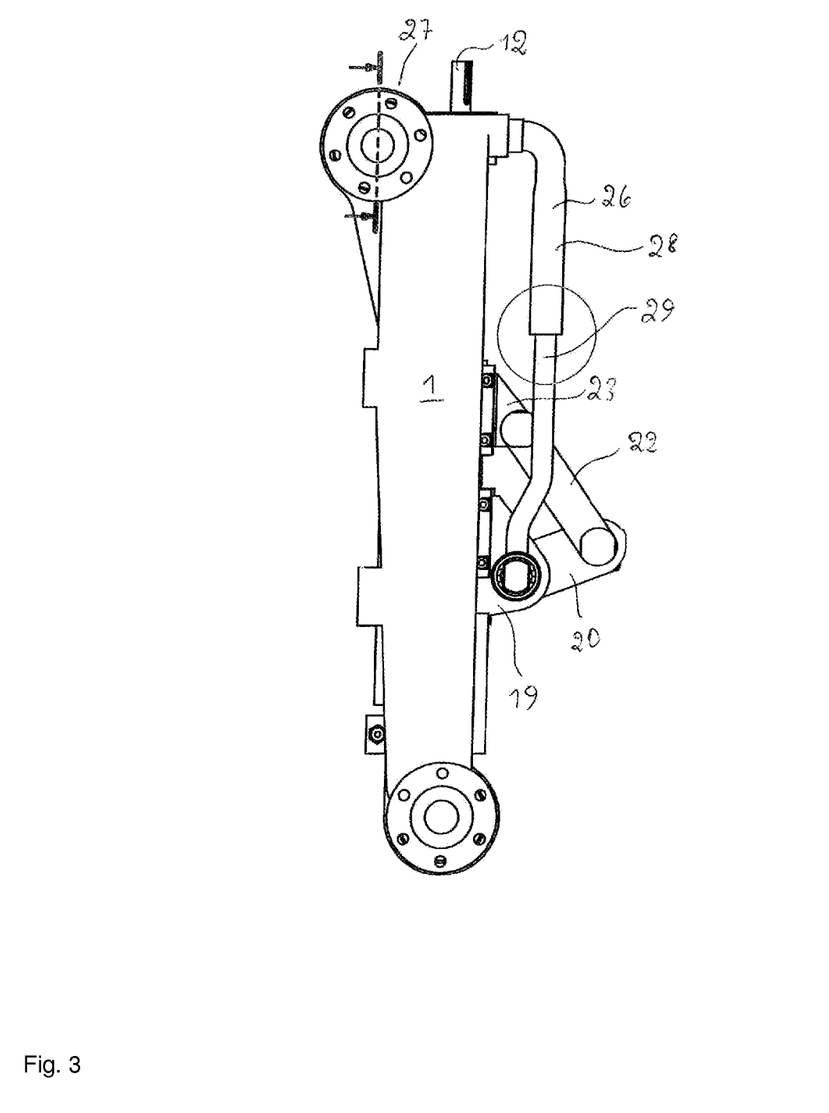
FIG. 3 shows a view of the module corresponding to a viewing direction III of FIG. 1.
Figure 4:
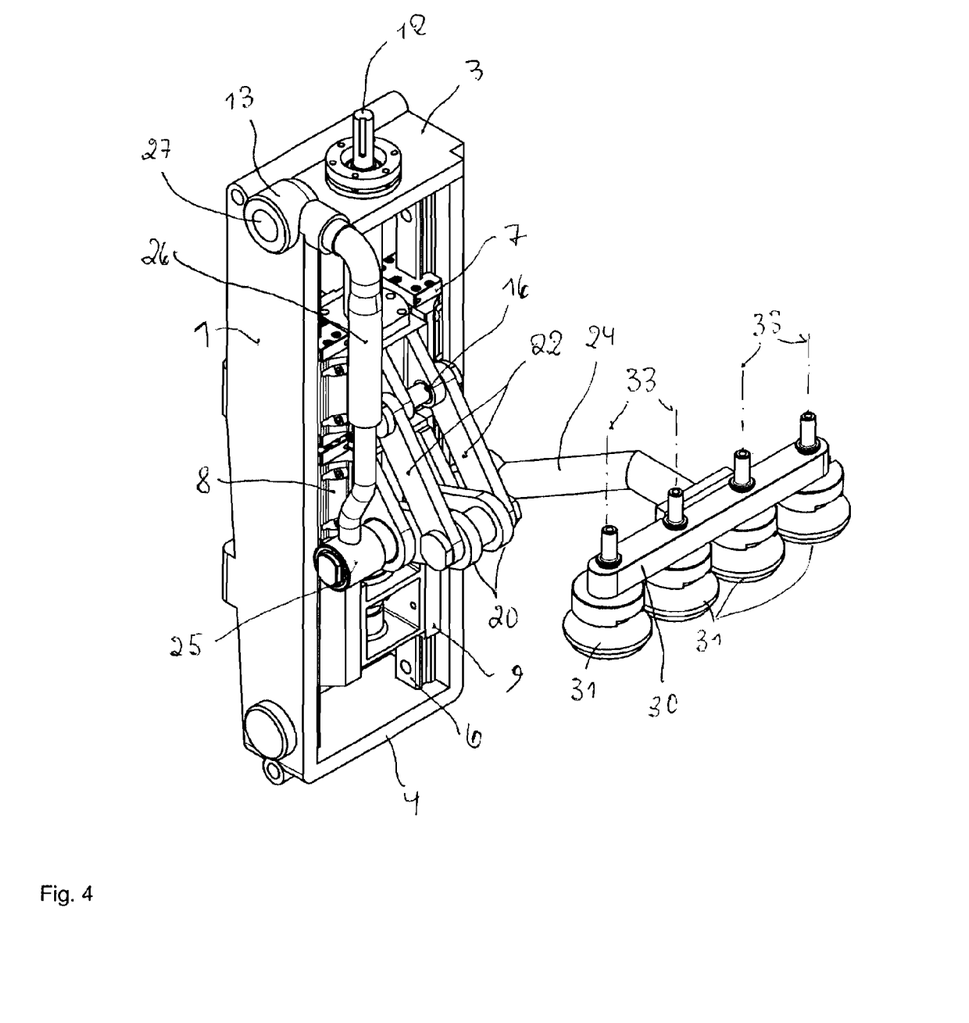
FIG. 4 shows a perspective right and top view of the module according to FIG. 1 in accordance with a pivoted-out position of the blow head.
Figure 5:
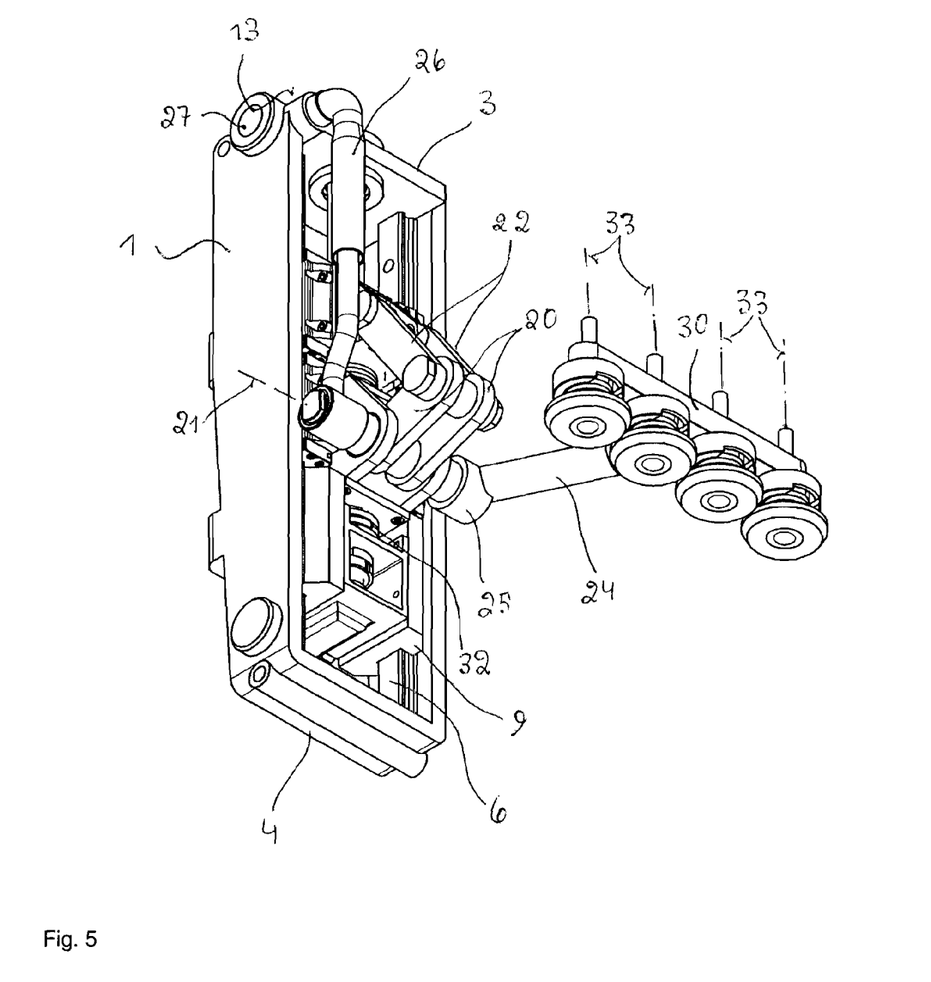
FIG. 5 shows a perspective right and bottom view of the module according to FIG. 4.

A threaded spindle is identified by 12 in FIG. 2, one end 13 of which protrudes out of the upper transverse wall 3 and has a drive connection at this point to a servomotor (not shown in the drawing). The threaded spindle 12 extends centrally between the side walls 1, 2, parallel thereto, and is engaged with a spindle nut 14 mounted in the first and uppermost carriage 7, so that by rotating the threaded spindle 12, the carriage 7 is linearly displaceable in the direction of the arrows 15 along the guides 5, 6 on both sides.

The carriage 7 is carrier of a cross head 16, whose function will be explained in greater detail hereafter.

The carriage 8 is carrier of a bearing block 17 and a stop 18, which is located on the top side thereof, facing toward the carriage 7.

The bearing block 17 is characterized by two bearing cheeks 19, in each of which one end of two crank arms 20 are mounted so they are rotatable around a common axis 21. The respective other ends of the two crank arms 20 are connected to one end of a connecting rod 22, the respective other ends of which are linked in bearing cheeks 23 of the bearing block 16.

Figure 1:
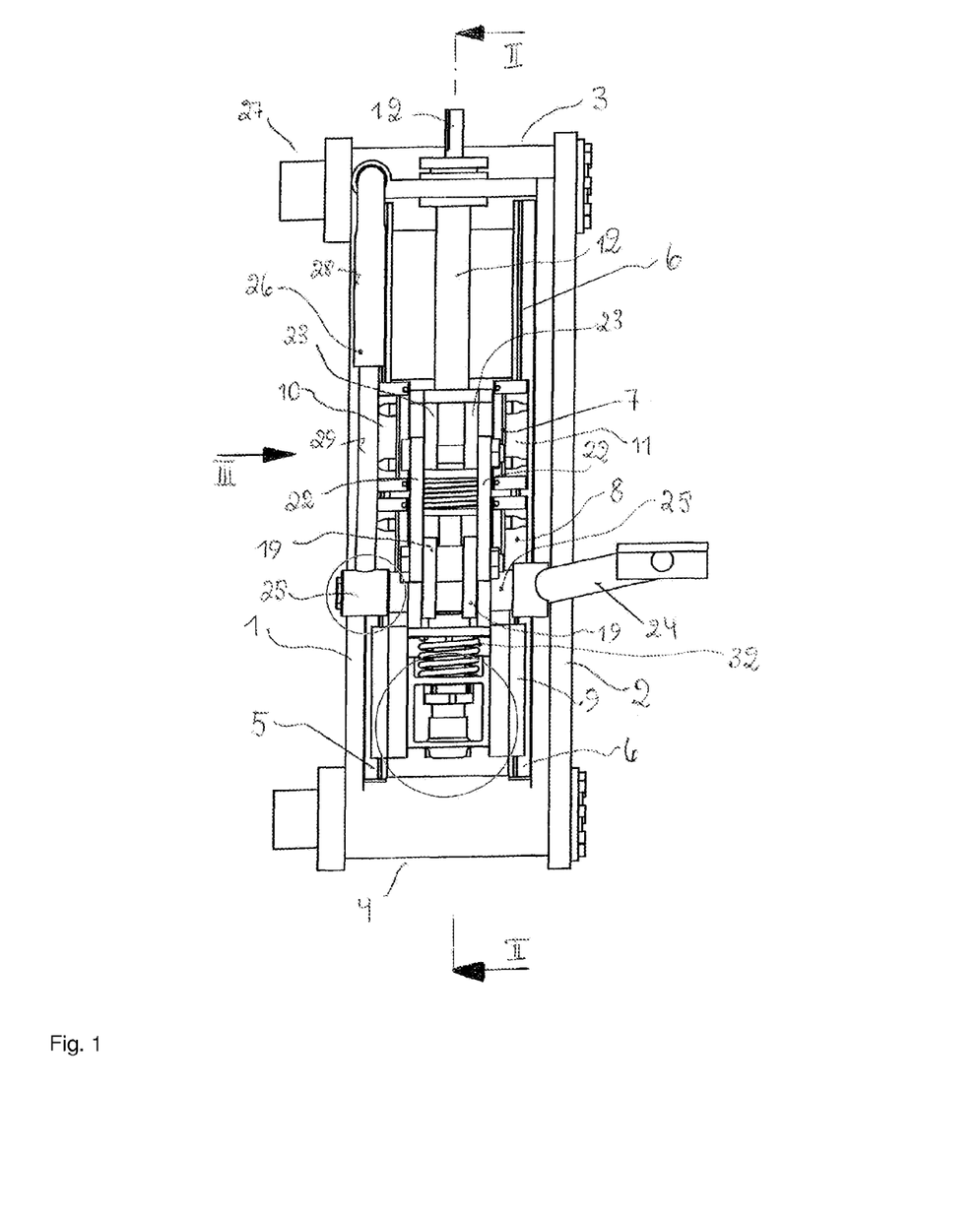
FIG. 1 shows a frontal view of a module according to the invention, used as a carrier of the blow head of an I. S. machine.

A hollow blow head arm (a boom) is identified by 24, one end of which has a through connection to the right end in FIG. 1 of a hollow shaft 25 extending in the direction of the axis 21 of the bearing block 17, the hollow shaft 25 being connected in a rotationally-locked manner to the connecting rod 20. The left end of the hollow shaft 25 is connected via a vertically extending pipeline 26 to a fitting 27 on the upper transverse wall 3. The pipeline 26 is characterized by two sections 28, 29, which are guided one inside another telescopically to form a seal.

The angled blow head arm 24 is connected at its end facing away from the hollow shaft 25 to a horizontal carrier 30, which extends parallel to a plane definable by the facing side of the side walls 1, 2 and the transverse walls 3, 4, and on which up to four blow head nozzles 31 situated in a row are situated. Starting from the fitting 27, a line system, which is used for the purpose of distributing blowing air to the blow head nozzles 31, is configured via the pipeline 26, the hollow shaft 25, the blow head arm 24, and the carrier 30.

The carriage 9 is situated fixedly in relation to the lateral guides 5, 6 and is used to support one end of a spring 32 in the axial direction of the threaded spindle 12, the other end of this spring 32 being supported on the carriage 8, in particular the bearing block 17. The mobility of the carriage 8 in an upward direction toward the carriage 7 is limited in a formfitting manner (not shown in the drawing), a mobility in the downward direction against the spring 32, which is under pretension, being possible.

If, starting from the retracted position of the blow head shown in FIG. 2, in which the connecting rod 20 is maximally pivoted clockwise around the axis 21, a rotational movement which moves the spindle nut 14 downward is introduced into the threaded spindle 12, with a simultaneous downward movement of the carriage 7 supporting the cross head 16, a pivot movement of the hollow shaft 25 results via the crank arms 22 and the connecting rod 20, and therefore of the blow head arm 24 carrying the blow head around the axis 21. This movement phase, which forms the first partial movement of the transfer curve, is solely a pivot movement and the carriage 8 initially does not yet change its location.

The pivot movement of the connecting rod 20 ends as soon as the carriage 7 has reached the stop 18, so that now a further relative movement of the carriages 7, 8 is suppressed. In this position, which is characterized by the carriage 7 pressing against the carriage 8, the axes 33 of the blow head nozzles 31 extend vertically and the design parameters of the crank drive, which consists of the connecting rod 20 and the crank arms 22, are configured accordingly.

In the case of a further rotation of the threaded spindle 12 beyond the last-mentioned position, the carriages 7, 8, which press against one another, now move as an assembly, i.e., while maintaining the vertical orientation of the axes 33 of the blow head nozzles 31, and therefore exclusively executing a downward movement.

The last mentioned movement phase, which forms the second partial movement, which can be a few millimeters, for example, is used for the purpose of transferring the blow head nozzles 31 into their active position, namely to place them on the corresponding mouth openings of the molds of the I. S. machine.

With given position of the molds, in the installation position of the module having the fixing of the uppermost position secured by the spring 32, an adaptation to a specific mold height is provided. A requirement for a precise vertical orientation of the axes 33 during the exclusive lift movement is an adaptation of the starting position of the carriage 7 to that of the carriage 8, so that a vertical orientation of the axes 33 is describable by pressing against the stop 18 at the end of the pivot phase.

In order to be able to perform an adjustment to a different mold height, a rail 34 is fastened on the carriage 7, which extends approximately parallel to the threaded spindle 12, and which protrudes into a clamping device 35 situated on the carriage 8.

In order to cause the adjustment, in the inactive position of the blow head according to FIG. 2, an engagement of the clamping device 35 with the rail 34 is first produced, so that the carriages 7, 8 are now rigidly connected and form an assembly movable as a unit. The clamping (not shown) is subsequently disengaged, which forms a path limit for an upward movement of the carriage 8 and against which it presses under the cooperation of the spring 32.

This assembly is subsequently displaced upward or downward by rotating the threaded spindle 12 for the purpose of adaptation to the changed mold height. If the correct position has been reached, the mentioned path limit for the carriage 8 adjacent to the bearing block 17 is activated, so that it presses against it under the pre-tension of the spring 32. The clamping device 35 is subsequently deactivated, so that the carriage 7 is displaceable between the inactive position of the blow head and a position at the end of the pivot movement in which the axes 33 are vertically oriented, in relation to the carriage 8 along the guides 5, 6.

The module is now set to a different mold height in accordance with the changed vertical position of the carriage 8.

LIST OF REFERENCE NUMERALS 1. side wall
2. side wall
3. transverse wall
4. transverse wall
5. guide
6. guide
7. carriage
8. carriage
9. carriage
10. guide profile
11. guide profile
12. threaded spindle
13. end
14. spindle nut
15. arrow
16. cross head
17. bearing block
18. stop
19. bearing cheek
20. crank arm
21. axis
22. connecting rod
23. bearing cheek
24. blow head arm
25. hollow shaft
26. pipeline
27. fitting
28. section
29. section
30. carrier
31. blow head nozzle
32. spring
33. axis
34. rail
35. clamping device

The invention claimed is:

1. A module for transferring a component, namely a blow head, a baffle, or a funnel of an I. S. glass molding machine, between a first position and a second position along a transfer curve composed of two partial movements, the two partial movements including a first partial movement consisting of a pivot movement around a horizontally extending axis and a second partial movement consisting of a vertically oriented linear movement, comprising:

a boom on which said component is supported, said boom being mounted so as to be rotatable around the axis and is pivotable between an essentially vertically extending first position and a horizontally extending second position, a threaded spindle capable of being driven rotatably, said rotational movement being convertible successively into the two partial movements, a spindle nut which is engaged with said threaded spindle to be moveable in an axial direction in response to rotation of said spindle;

a framework having two vertically extending guides which are parallel to one another, at least two carriages, including an upper carriage and a lower carriage, received in said guides, the upper carriage being configured to move in the axial direction of the spindle nut in response to movement of the spindle nut and the upper carriage has a cross head mounted thereto for movement therewith, said lower carriage having a shaft mounted thereon extending in the direction of the axis a crank drive connected to said threaded spindle via said spindle nut for initiating the first and second partial movements successively, said crank drive having at least one crank arm, at least one connecting arm linked to said crank arm, and a crank pin formed by said shaft of said lower carriage which rotates in response to movement of said crank arm, said connecting rod being connected to said cross head to convert the linear movement of the cross head along the spindle shaft into movement of the crank arm which in turn pivots said crank pin, said boom being configured to rotate with the pivoting of said crank pin, a stop disposed on one of the carriages to limit the displacement movement of the upper carriage relative to the lower carriage, with the proviso that the boom extends horizontally in the second position, and wherein said rotational movement of the threaded spindle is convertible successively into the two partial movements of the transfer curve, the pivot movement of the first partial movement is a rotational movement around the axis by the pivoting of said crank pin, which rotation is limited to an angular value, and the linear movement of the second partial movement is a movement perpendicular to the axis by linear movement of the carriages which succeeds the rotational movement.

2. The module according to claim 1, wherein the lower carriage is displaceable in the downward direction against the force of a spring.

3. A module for transferring a component, namely a blow head, a baffle, or a funnel of an I. S. glass molding machine, between a first position and a second position along a transfer curve composed of two partial movements, the two partial movements including a first partial movement consisting of a pivot movement around a horizontally extending axis and a second partial movement consisting of a vertically oriented linear movement, comprising:

a boom on which said component is supported, said boom being mounted so as to be rotatable around the axis and is pivotable between an essentially vertically extending first position and a horizontally extending second position, a threaded spindle capable of being driven rotatably, said rotational movement being convertible successively into the two partial movements, a spindle nut which is engaged with said threaded spindle to be moveable in an axial direction in response to rotation of said spindle;

a framework having two vertically extending guides which are parallel to one another, at least two carriages, including an upper carriage and a lower carriage, received in said guides, the upper carriage being configured to move in the axial direction of the spindle nut in response to movement of the spindle nut and the upper carriage has a cross head mounted thereto for movement therewith, said lower carriage having a shaft mounted thereon extending in the direction of the axis a crank drive connected to said threaded spindle via said spindle nut for initiating the first and second partial movements successively, said crank drive having at least one crank arm, at least one connecting arm linked to said crank arm, and a crank pin formed by said shaft of said lower carriage which rotates in response to movement of said crank arm, said connecting rod being connected to said cross head to convert the linear movement of the cross head along the spindle shaft into movement of the crank arm which in turn pivots said crank pin, said boom being configured to rotate with the pivoting of said crank pin, a stop disposed on one of the carriages to limit the displacement movement of the upper carriage relative to the lower carriage, with the proviso that the boom extends horizontally in the second position, and wherein said rotational movement of the threaded spindle is convertible successively into the two partial movements of the transfer curve, the pivot movement of the first partial movement is a rotational movement around the axis by the pivoting of said crank pin, which rotation is limited to an angular value, and the linear movement of the second partial movement is a movement perpendicular to the axis by linear movement of the carriages which succeeds the rotational movement, wherein the lower carriage is displaceable in the downward direction against the force of a spring and once said two carriages contact one another at said stop, both carriages are displaceable against the spring as a group along the threaded spindle, while maintaining the horizontal orientation of the boom.

4. The module according to claim 1, wherein the position of the lower carriage is adjustable in relation to a reference level, while maintaining the horizontal orientation of the boom upon contact of the carriages via the stop.

5. A module for transferring a component, namely a blow head, a baffle, or a funnel of an I. S. glass molding machine, between a first position and a second position along a transfer curve composed of two partial movements, the two partial movements including a first partial movement consisting of a pivot movement around a horizontally extending axis and a second partial movement consisting of a vertically oriented linear movement, comprising:

a boom on which said component is supported, said boom being mounted so as to be rotatable around the axis and is pivotable between an essentially vertically extending first position and a horizontally extending second position, a threaded spindle capable of being driven rotatably, said rotational movement being convertible successively into the two partial movements, a spindle nut which is engaged with said threaded spindle to be moveable in an axial direction in response to rotation of said spindle;

a framework having two vertically extending guides which are parallel to one another, at least two carriages, including an upper carriage and a lower carriage, received in said guides, the upper carriage being configured to move in the axial direction of the spindle nut in response to movement of the spindle nut and the upper carriage has a cross head mounted thereto for movement therewith, said lower carriage having a shaft mounted thereon extending in the direction of the axis a crank drive connected to said threaded spindle via said spindle nut for initiating the first and second partial movements successively, said crank drive having at least one crank arm, at least one connecting arm linked to said crank arm, and a crank pin formed by said shaft of said lower carriage which rotates in response to movement of said crank arm, said connecting rod being connected to said cross head to convert the linear movement of the cross head along the spindle shaft into movement of the crank arm which in turn pivots said crank pin, said boom being configured to rotate with the pivoting of said crank pin, a stop disposed on one of the carriages to limit the displacement movement of the upper carriage relative to the lower carriage, with the proviso that the boom extends horizontally in the second position, and wherein said rotational movement of the threaded spindle is convertible successively into the two partial movements of the transfer curve, the pivot movement of the first partial movement is a rotational movement around the axis by the pivoting of said crank pin, which rotation is limited to an angular value, and the linear movement of the second partial movement is a movement perpendicular to the axis by linear movement of the carriages which succeeds the rotational movement, wherein the position of the lower carriage is adjustable in relation to a reference level, while maintaining the horizontal orientation of the boom upon contact of the carriages via the stop and both carriages can be rigidly coupled by means of a rail, so that the position of the lower carriage in relation to the reference level is settable by means of the crank drive, while maintaining the horizontal orientation of the boom upon contact of the carriages via the stop.

6. The module according to claim 1, further comprising a hollow shaft extending in the direction of the axis, to which the boom supporting the component is attached.

7. The module according to claim 6, wherein the hollow shaft is connected to a pipeline which has a fitting at its end, and which forms a continuous air supply line starting from the fitting to the component.

8. The module according to claim 7, wherein the blow head nozzles, the pre-floor nozzles, or the funnel, comprising the component, have axes that extends vertically when the boom is in a horizontal position.

9. The module according to claim 7, wherein the pipeline comprises two sections which are displaceable telescopically relative to one another in the axial direction, one of which is connected to the fitting and the other which is connected to the hollow shaft, to bridge the displaceability of the carriages.

10. The module according to claim 1, further comprising a third carriage, which is fixedly mounted on the guides, and in which a spring is supported.

11. The module according to claim 2, wherein the position of the lower carriage is implemented as settable in relation to a reference level, while maintaining the horizontal orientation of the boom upon contact of the carriages via the stop.

12. The module according to claim 3, wherein the position of the lower carriage is adjustable in relation to a reference level, while maintaining the horizontal orientation of the boom upon contact of the carriages via the stop.

13. The module according to claim 2 further comprising a hollow shaft extending in the direction of the axis, to which the boom supporting the component is attached.

14. The module according to claim 3 further comprising a hollow shaft extending in the direction of the axis, to which the boom supporting the component is attached.

15. The module according to claim 4 further comprising a hollow shaft extending in the direction of the axis, to which the boom supporting the component is attached.

16. The module according to claim 5 further comprising a hollow shaft extending in the direction of the axis, to which the boom supporting the component is attached.

17. The module according to claim 8, wherein the pipeline two sections which are displaceable telescopically relative to one another in the axial direction, one of which is connected to the fitting and the other which is connected to the hollow shaft, to bridge the displaceability of the carriages.

18. The module according to claim 2, further comprising a third carriage, which is situated fixedly mounted on the guides, and in which the spring is supported.

19. The module according to claim 3, further comprising a third carriage, which is situated fixedly mounted on the guides, and in which the spring is supported.

20. The module according to claim 4, further comprising a third carriage, which is situated fixedly mounted on the guides, and in which the spring is supported.

* * * * *